US006299661B1

(12) United States Patent
Bloomer

(10) Patent No.: US 6,299,661 B1
(45) Date of Patent: Oct. 9, 2001

(54) TWIST FIT CONNECTION FOR AIR CLEANERS

(75) Inventor: Stephen F. Bloomer, London (CA)

(73) Assignee: Siemens Canada Limited, Tilbury (CA)

( * ) Notice: Subject to any disclaimer, the term of this patent is extended or adjusted under 35 U.S.C. 154(b) by 0 days.

(21) Appl. No.: 09/342,702

(22) Filed: Jun. 29, 1999

Related U.S. Application Data

(63) Continuation-in-part of application No. 09/310,672, filed on May 12, 1999, now Pat. No. 6,167,862.

(51) Int. Cl.[7] .......................... B01D 39/18; F02M 35/02

(52) U.S. Cl. .......................... 55/385.3; 55/498; 55/502

(58) Field of Search .......................... 55/385.3, 498, 55/502, 503; 123/198 E; 220/324; 210/232, 238

(56) References Cited

U.S. PATENT DOCUMENTS 1,577,990 3/1926 C. Van Deventer .
4,006,000 2/1977 Tortorici et al. .
4,896,590 * 1/1990 Groos .......................... 55/502
4,915,831 * 4/1990 Taylor .......................... 55/502
5,049,170 * 9/1991 Parnoff .......................... 55/498
5,114,572 * 5/1992 Hunter et al. .......................... 55/502
5,277,157 1/1994 Teich .
5,342,126 8/1994 Heston et al. .
5,770,065 * 6/1998 Popoff et al. .......................... 210/232
5,865,863 * 2/1999 DeSousa et al. .......................... 55/497
6,039,778 * 3/2000 Coulonvaux .......................... 55/498
6,051,042 4/2000 Coulonvaux .
6,167,862 * 1/2001 Powell et al. .......................... 123/198 E

FOREIGN PATENT DOCUMENTS 1249 590 9/1967 (DE) .
370951 3/1988 (DE) .
0 736 683 10/1996 (EP) .
0 896 148 2/1999 (EP) .

OTHER PUBLICATIONS

European Search Report completed Apr. 20, 2001.

* cited by examiner

*Primary Examiner*—David A. Simmons
*Assistant Examiner*—Frank M. Lawrence

(57) ABSTRACT

An air cleaner housing system with an detachable air cleaner tube and a method of doing same. The air cleaner housing system includes the air cleaner tube, an air cleaner housing including an aperture, an air filter disposed inside the air cleaner housing, an attachment mechanism comprising a first portion disposed on the air cleaner tube and a second portion disposed on the air cleaner housing, and a first seal disposed between the air filter and the air cleaner tube. The attachment mechanism is a radial twist fit connector which moves between a first rotational position to attach the air cleaner tube to the air cleaner housing, and a second rotational position to detach the air cleaner tube from the air cleaner housing. Alternately, the attachment mechanism is an axial twist fit connector.

21 Claims, 3 Drawing Sheets

TWIST FIT CONNECTION FOR AIR CLEANERS

This application is a Continuation-in-Part of U.S. patent application Ser. No. 09/310,672 filed May 12, 1999 now U.S. Pat. No. 6,167,862.

FIELD OF THE INVENTION

The invention relates generally to air cleaner housing systems. In particular, it relates to devices and methods for attaching an air cleaner tube to the air cleaner housing to facilitate introducing dirty air into or removing clean air from the air cleaner housing.

BACKGROUND OF THE INVENTION

Air cleaner housings are typically arranged to support one or more air filter elements within and two or more air cleaner tubes attached thereto to bring dirty air into the air cleaner housing and to carry clean air out of the air cleaner housing. The air cleaner tubes, in turn, are also connected to various components such as an intake manifold in the case of clean air in an air cleaner housing for motor vehicles. In order for an air cleaner housing to be effective, it should provide an adequate seal between various components within the housing to prevent air from leaking around the air filter element (s) to the clean air side without first passing through the air filter element(s). In addition, some sort of access port should be provided on the housing to permit replacement of the air filter elements.

Currently, air cleaner housings are available in a variety of shapes and configurations. Many provide a separate access location to facilitate replacement of an air filter element within the housing. For example, the housing may comprise two shells in which the top shell is removable to provide access to the air filter element disposed on the bottom shell. Unfortunately, such configuration requires even tensioning of the two shells along its entire periphery edge in order to provide an adequate seal; hence, many fasteners are needed around the periphery of the shells and a significant amount of time and manual dexterity is required to properly loosen and tighten these fasteners. Other air cleaner housings provide openings for attaching air cleaner tubes to the housing. However, similar to providing access locations to facilitate filter element replacements, such openings on the housing presents additional problems in maintaining adequate sealing between components to prevent undesirable dirty air movement. Typically the air cleaner tube must be attached to the housing using cumbersome attachment devices and/or sealants to insure a close enough fit, or the air cleaner tube has to be permanently attached to the housing to get around the sealing problem. The primary shortcoming of this configuration is the decrease in maneuverability of the air cleaner housing system within a confined space such as in a motor vehicle since the housing and its attached air cleaner tube acts as one unit, as well as the need to possibly replace both the housing and the attached air cleaner tube even if only one part has been damaged.

Thus, there is a need for an air cleaner housing system that is capable of providing relatively easy access to replace air filter elements disposed within the housing, an inexpensive and easy to operate attachment device for attaching the air cleaner tube to the housing, the ability to attach and detach the air cleaner tube repeatedly as desired, and providing adequate seal(s) between the various components within the housing to prevent air from leaking around to the clean air side without first passing through the air filter element.

SUMMARY OF THE PRESENT INVENTION

One embodiment of the invention relates to an air cleaner system having an air cleaner tube extending along a central axis and an air cleaner housing including an aperture, wherein the aperture size and shape is configured to receive one end of the air cleaner tube. The air cleaner system further includes a twist fit connector having a first portion disposed around the air cleaner tube and a second portion positioned on the air cleaner housing, wherein the first portion includes a first plurality of spaced-apart flanges cincturing a substantially circular first edge thereof and the second portion includes a second plurality of spaced-apart flanges cincturing a corresponding substantially circular first edge thereof.

Another embodiment of the invention relates to an air cleaner having an air cleaner tube extending along a central axis, an air cleaner tube having an opening to partially receive the air cleaner tube, and a removable air filter disposed inside the air cleaner box. The air cleaner further includes a first portion of a twist fit connector disposed around the air cleaner tube, having a first plurality of spaced-apart flanges and a locking element, and a second portion of the twist fit connector disposed on the air cleaner box, having a second plurality of spaced-apart flanges and a receiving element, wherein the twist fit connector moves between a first position to hold the air cleaner box and tube together and a second position to detach the air cleaner tube from the air cleaner box. The air cleaner still further includes a first seal disposed between the air filter and the air cleaner tube, whereby dirty air passes through the air filter before exiting the air cleaner box when the twist fit connector is in the first position.

Still another embodiment of the invention relates to a method of assembling an air cleaner comprising inserting one end of an air cleaner tube into an opening of an air cleaner housing, aligning a locking element and a receiving element along a central axis, inserting a first plurality of flanges encircling the air cleaner tube in between the corresponding spaces between a second plurality of flanges disposed on the air cleaner housing, contacting the locking and receiving elements, and rotating the locking element relative to the receiving element around the central axis till further rotation in either direction is prevented by the locking element abutting a section of the receiving element.

Other principal features and advantages of the invention will become apparent to those skilled in the art upon review of the following drawings, the detailed description and the appended claims.

Figure 1:
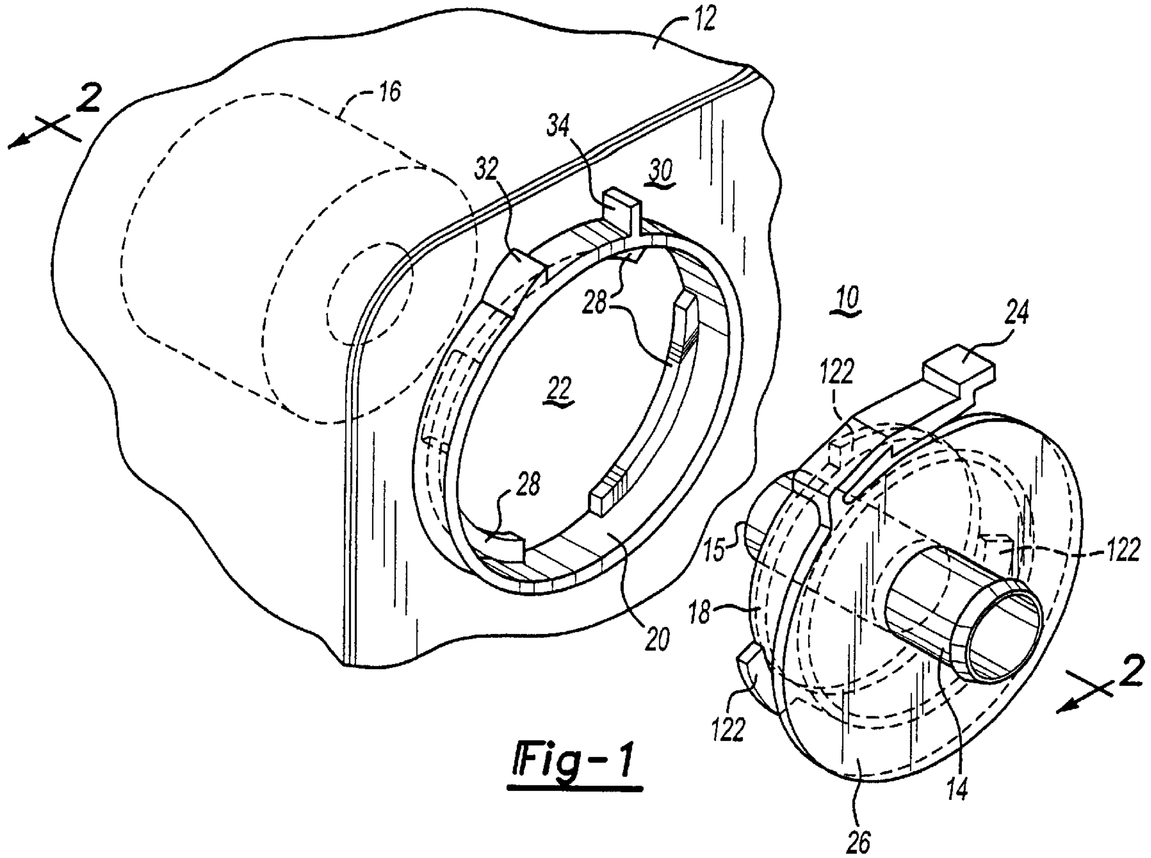
FIG. 1 is a perspective view of an air cleaner housing system shown in a second position in accordance with the present invention.

Before explaining at least one embodiment of the invention in detail, it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Figure 2:
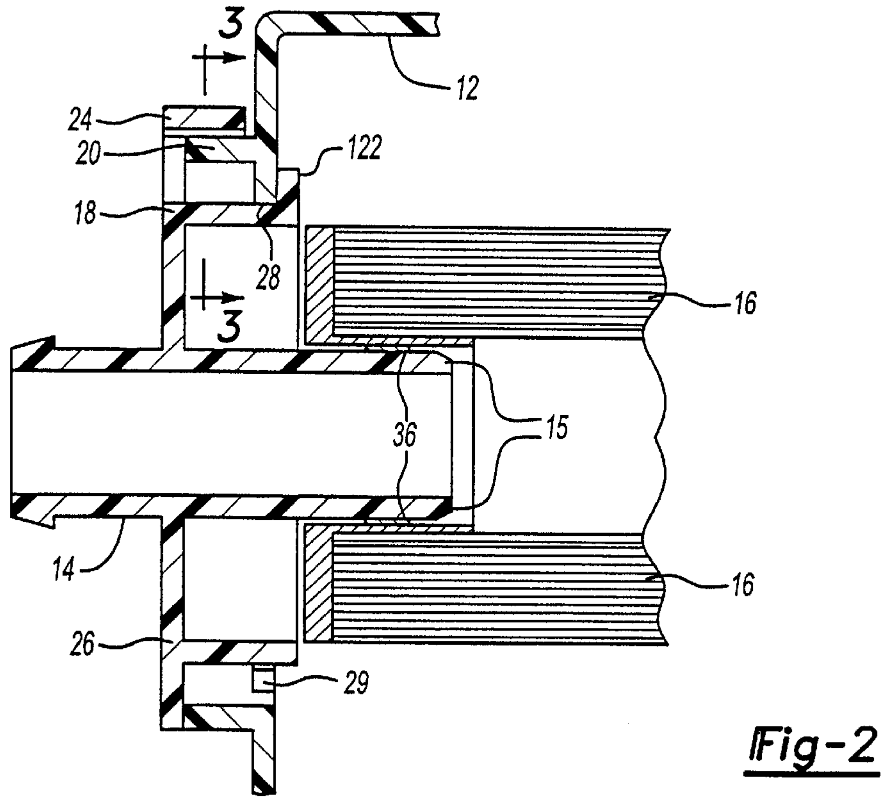
FIG. 2 is a partial cross-sectional side view of the air cleaner housing system of FIG. 1 shown in a first position.

Referring to FIGS. 1 and 2, there is shown an air cleaner housing system 10 including an air cleaner housing 12, an air cleaner tube 14, an air filter element 16, a first portion 18 of an attachment mechanism of the radial-type twist fit connector, a second portion 20 of the attachment mechanism, and a first seal 36.

Air cleaner housing 12, also referred to as an air cleaner container or box, includes an aperture 22 on a side of the air cleaner housing 12 for partially receiving the air cleaner tube 14. Aperture 22 is substantially circular in shape and of a sufficient diameter to accommodate the air cleaner tube 14. Aperture 22 may also serve as an access point for replacing the air filter element 16 housed within the air cleaner housing 12. Alternatively, air cleaner housing 12 can include multiple apertures to accommodate multiple air cleaner tubes or provide a separate access point, e.g., a door, for filter replacements (not shown). The air cleaner housing 12 can be fabricated in a variety of shapes and materials. For example, air cleaner housing 12 can be a parallelepiped formed from a plastic-type material.

Air filter element 16 fits through aperture 22 and resides inside air cleaner housing 12. Air filter element 16 is preferably an elongate radial flow air filter axially extending along a central axis running through air cleaner housing 12. Moreover, in cross-section, air filter element 16 comprises an outer circumference and a hollow inner circumference, in which the diameter of the inner circumference is large enough to accommodate the air cleaner tube 14 (see FIG. 2). Alternatively, if the air cleaner housing 12 provides a separate access point, the outer circumference of air filter element 16 could be larger than the diameter of aperture 22. Moreover, air filter element 16 is typically a disposable air filter comprised of a zigzagged paper or synthetic air cleaning medium that removes particulate matter from air as it passes through the cleaning medium.

Air cleaner tube 14 includes an end 15 having a substantially circular cross-section for snuggly fitting inside the hollow inner circumference of air filter element 16. It should be understood that the rest of the air cleaner tube 14 may differ in shape and/or size along the rest of its length relative to end 15 of air cleaner tube 14 (not shown).

First and second portions 18, 20 collectively comprise the attachment mechanism which attaches the air cleaner tube 14 to the air cleaner housing 12. First portion 18, substantially circular and encircling the air cleaner tube 14, includes a first plurality of flanges 122, a radial locking element 24, and a cover plate 26. Second portion 20, disposed on the air cleaner housing 12 and encircling aperture 22, includes a second plurality of flanges 28 and a radial receiving element 30.

In the preferred embodiment, the first plurality of flanges 122 are disposed around a first edge of the first portion 18, in which the first edge is parallel and proximate to end 15 of the air cleaner tube 14. Each of the first plurality of flanges 122 are equally spaced apart from each other and extend or radiate in an outward direction. Preferably, a minimum of three flanges will comprise the first plurality of flanges 122. The second plurality of flanges 28 are disposed around a first edge of the second portion 20. Each of the second plurality of flanges 28 is also equally spaced apart from each other but extend or radiate in an inward direction. Preferably, a minimum of three flanges will similarly comprise the second plurality of flanges 28. Therefore, when the first plurality of flanges 122 are positioned at aperture 22, the first plurality of flanges 122 can be inserted in the spaces between the second plurality of flanges 28.

Cover plate 26 is disposed on a second edge of first portion 18, in which the second edge is parallel to end 15 and is further away from end 15 then the first edge of first portion 18. Radial locking element 24 is disposed on the outer diameter of cover plate 26. Radial locking element 24 faces radially inward and is preferably a stepped cantilever snap element. Moreover, the radial locking element 24 is preferably comprised of a semi-flexible material, such as a plastic-type material, to facilitate attaching and detaching the air cleaner tube 14 to and from the air cleaner housing 12.

Radial receiving element 30 is disposed on a second edge of the second portion 20. Radial receiving element 30 faces radially outward to correspondingly engage the radially inward facing radial locking element 24. Radial receiving element 30 preferably comprises a ramped element 32 and a stop element 34.

When air cleaner tube 14 is fully attached to the air cleaner housing 12, i.e., in a first rotational position to be described later, both the air cleaner tube 14 and the air filter element 16 will contact and slightly compress the first seal 36 disposed therebetween. First seal 36 can be attached around the inner circumference of air filter element 16 or it can cincture the outer circumference of end 15 of the air cleaner tube 14. First seal 36 prevents dirty air from bypassing the air filter element 16 and inadvertently entering the clean air side of the air cleaner housing system. In the preferred embodiment, first seal 36 is an O-ring.

Figure 3:
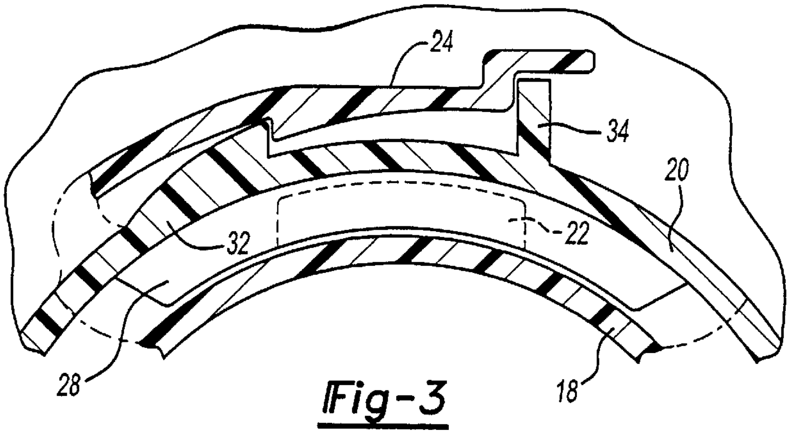
FIG. 3 is a partial cross-sectional view of an attachment mechanism of the air cleaner housing system of FIG. 1 shown in the first position.

In use, the attachment mechanism moves between a first rotational position, in which the air cleaner tube 14 is fully attached to the air cleaner housing 12, and a second rotational position, in which the air cleaner tube 14 is detachable from the air cleaner housing 12. To achieve the first rotational position, end 15 of air cleaner tube 14 is inserted through aperture 22 into the air cleaner housing 12. The radial locking element 24 is then aligned with the radial receiving element 30 relative to the central axis extending along the air cleaner tube 14 and through the center of aperture 22 such that the first plurality of flanges 122 fits in the spaces between the second plurality of flanges 28. Continuing to insert end 15 into the air cleaner housing 12, when cover plate 26 of the first portion 18 comes in contact with the second portion 20, air cleaner tube 14 has been fully inserted into the air cleaner housing 12. At this point, end 15 is in contact with the first seal 36 and the first plurality of flanges 122 are in a plane behind the plane containing the second plurality of flanges 28 (see FIG. 2). The attachment is completed, as shown in FIG. 2, by rotating the first portion 18 in a clockwise rotation around the central axis relative to the air cleaner housing 12, such that the first plurality of flanges 122 rotate behind the second plurality of flanges 28 and the radial locking element 24 engages the ramped element 32, bends somewhat in the radial direction, and eventually abuts the stop element 34. When the radial locking element 24 abuts the stop element 34, it prevents further rotation of the first portion 18 in the clockwise or counterclockwise direction (as shown in FIG. 3). Air cleaner tube 14 is also secured against axial movement, i.e., being pulled out of the air cleaner housing 12, by the second plurality of flanges 28.

To achieve the second rotational position, the radial locking element 24 is pulled radially away from the radial receiving element 30 to disengage the attachment mechanism so that counter-clockwise rotation of the first portion 18 can commence. When the first plurality of flanges 122 are aligned behind the spaces between the second plurality of flanges 28, air cleaner tube 14 can be detached from the air cleaner housing 12. Thus by, moving between the first and second rotational positions, the air cleaner tube 14 can be attached and detached repeatedly, as desired.

Figure 4:
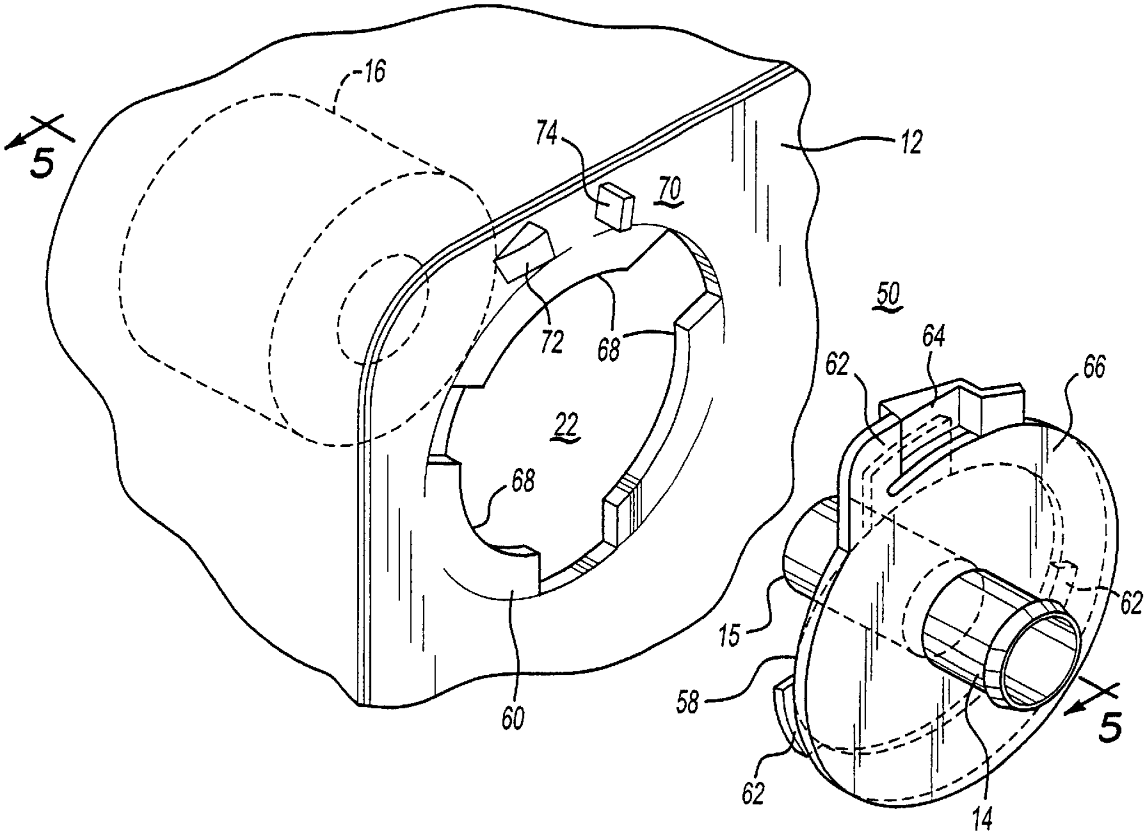
FIG. 4 is a perspective view of an alternate embodiment of the air cleaner housing system of FIG. 1 shown in the second position.
Figure 5:
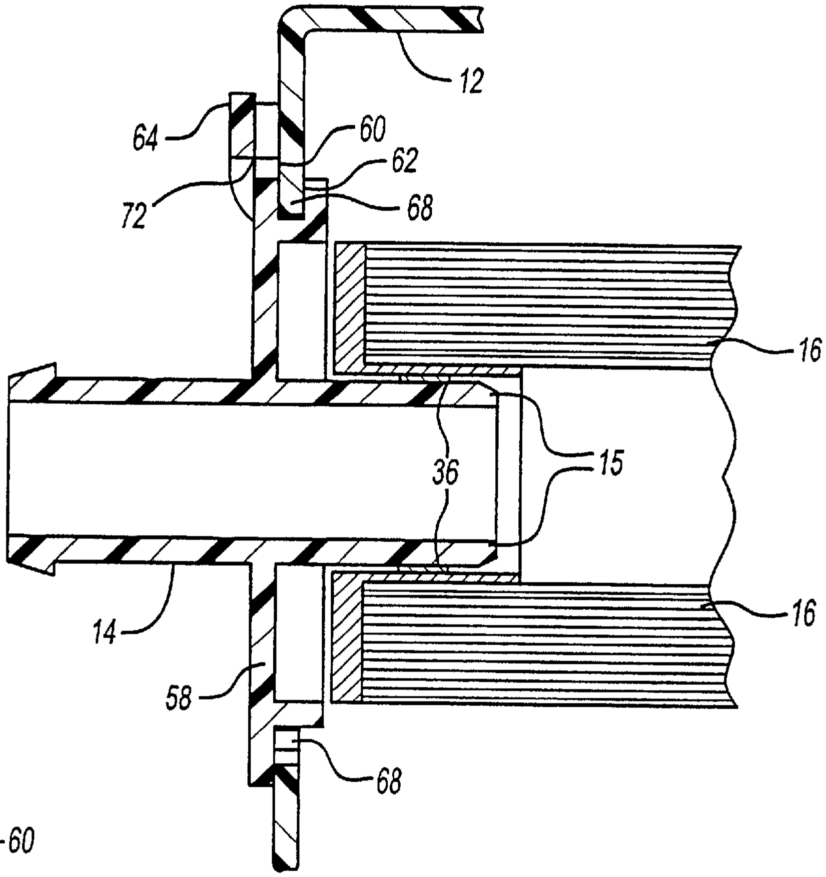
FIG. 5 is a partial cross-sectional side view of the alternate embodiment of the air cleaner housing system of FIG. 1 shown in the first position.

The air cleaner housing system of the present invention can be embodied with various other structures. FIGS. 4 and 5 illustrates an alternate embodiment of the air cleaner housing system 10. Air cleaner housing system 50 is similar to system 10 except that system 50 embodies an attachment mechanism of the axial-type twist fit connector. The attachment mechanism comprises a first portion 58, which includes a first plurality of flanges 62, an axial locking element 64, and a cover plate 66, and a second portion 60, which includes a second plurality of flanges 68 and an axial receiving element 70. The axial locking element 64 faces toward the air cleaner housing 12 and is flexible in the axial direction. The axial receiving element comprises a ramped element 72 and a stop element 74 in which both face toward the air cleaner tube 14. As shown in FIG. 4, the second portion 60 can be integrally molded as part of the air cleaner housing 12. In this embodiment, in the first rotational position, the axial locking element 64 bends in the axial direction as it engages and moves along the ramped element 72 and abuts the stop element 74. And to achieve the second rotational position, the axial locking element 64 is pulled in the axial direction away from the axial receiving element 70 and then rotated in the counter-clockwise direction to detach the air cleaner tube 14.

Figure 6:
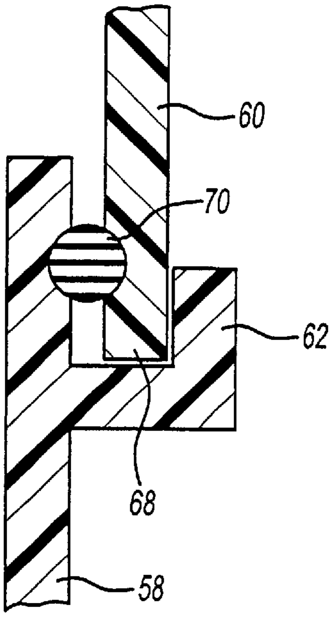
FIG. 6 is a partial cross-sectional view of a seal between the air cleaner housing and the air cleaner tube of the system of FIG. 1.
Figure 7:
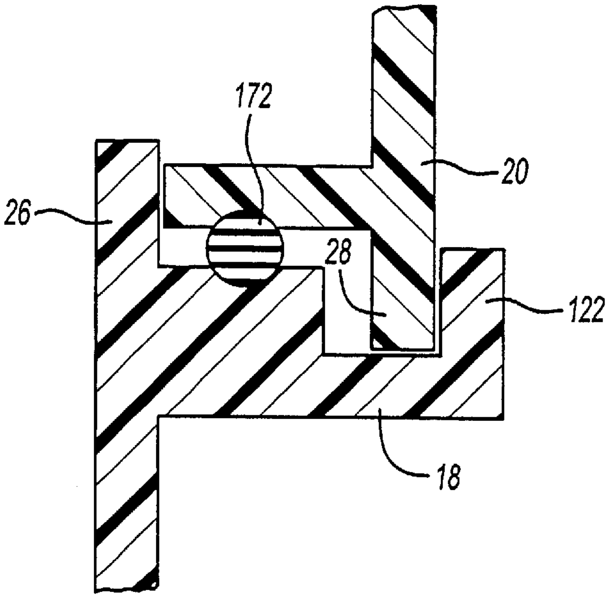
FIG. 7 is a partial cross-sectional view of an alternate seal between the air cleaner housing and the air cleaner tube of the system of FIG. 1.

Substitutions or additions may be made to the preferred embodiment of the air cleaner housing system without departing from the beneficial features of the above-described invention. For example, each of the first plurality of flanges 122 could include an angled end, as shown in FIG. 2, to further prevent undesirable detachment of the air cleaner tube 14 when in the first rotational position. FIG. 6 shows a second seal 70 disposed between the first and second portions 58, 60 to provide an axial air tight seal at the connection interface thereof. FIG. 7 shows a second seals 172 disposed between the first and second portions 18, 20 to provide a radial air tight seal at the connection interface thereof. As with the first seal 36, second seals 70, 172 each comprises an O-ring. In another example, the first plurality of flanges 122 could be inwardly radiating flanges while the second plurality of flanges 28 could be outwardly radiating flanges.

In still another example, the first and second portions 18, 20 may be integrally molded with the air cleaner tube 14 and housing 12, respectively, to minimize fabrication costs and breakage of subcomponents. Alternatively, the attachment mechanism could be configured to require counter-clockwise rotation to achieve the first rotational position and clockwise rotation to achieve the second rotational position. And in still another embodiment, the air filter element 16 may be attached to the air cleaner tube 14 such that they move together as one unit. In this case the first seal 36 could be omitted as well as the apparatus for holding the air filter element 16 in place inside the air cleaner housing 12.

Thus, it should be apparent that there has been provided in accordance with the present invention an air cleaner housing system that fully satisfies the objectives and advantages set forth above. Although the invention has been described in conjunction with specific embodiments thereof, it should be evident that many alternatives, modifications, and variations will be apparent to those skilled in the art. Accordingly, the present invention is intended to embrace all such alternatives, modifications, and variations that fall within the spirit and broad scope of the appended claims.

The embodiments of the invention in which an exclusive property or privilege is claimed are defined as follows:

1. An air cleaner system, comprising:

an air cleaner tube extending along a central axis;

air cleaner housing including an aperture, wherein the aperture size and shape is configured to receive one end of the air cleaner tube; and a twist fit connector having a first portion disposed around the air cleaner tube and a second portion positioned on the air cleaner housing;

wherein the first portion includes a first plurality of spaced-apart flanges cinturing a substantially circular first edge thereof and the second portion includes a second plurality of spaced-apart flanges cinturing a corresponding substantially circular first edge thereof, the first plurality of flanges configured to be inserted in the spaces between the second plurality of flanges to engage the air cleaner housing and tube together when in a first rotational position and configured to detach the air cleaner tube from the air cleaner housing when in a second rotational position.

2. The air cleaner system of claim 1, further comprising:

an air filter element disposed within the air cleaner housing; and a first seal disposed between the air filter element and the air cleaner tube, wherein dirty air passes through the air filter element before exiting the air cleaner housing when the twist fit connector is in the first rotational position.

3. The air cleaner system of claim 1, wherein the first plurality of flanges comprise a plurality of outwardly radiating flanges and the second plurality of flanges comprise a plurality of inwardly radiating flanges.

4. The air cleaner system of claim 1, wherein the first plurality of flanges comprise a plurality of inwardly radiating flanges and the second plurality of flanges comprise a plurality of outwardly radiating flanges.

5. The air cleaner system of claim 1, further comprising a second seal disposed between the first and second portions of the twist fit connector.

6. The air cleaner system of claim 5, wherein at least one of the first and second seal is an O-ring.

7. The air cleaner system of claim 1, wherein the twist fit connector further comprises an attachment mechanism having a locking element disposed on a second edge of the first portion and a receiving element disposed on a second edge of the second portion, whereby the attachment mechanism is configured to move between the first rotational position, in which the locking element engages and is held by the receiving element by rotating the first portion around the central axis extending along the length of the air cleaner tube, and the second rotational position, in which the locking element detaches from the receiving element by rotating the first portion in the opposite direction around the central axis extending along the length of the air cleaner tube.

8. The air cleaner system of claim 7, wherein the locking element of the attachment mechanism is a stepped cantilever snap element and the receiving element of the locking mechanism comprises a ramped element and a stop element.

9. The air cleaner system of claim 7, wherein the locking element comprises a radial locking element having a radially inward facing side and the receiving element comprises a radial receiving element having a radially outward facing side, whereby the radially inward facing side of the radial locking element and the radially outward facing side of the radial locking element engage in the first rotational position and disengage in the second rotational position.

10. The air cleaner system of claim 7, wherein the locking element comprises an axial locking element having an air cleaner housing facing side and the receiving element comprises an axial receiving element having an air cleaner tube facing side, whereby the air cleaner housing facing side and the air cleaner tube facing side engage in the first rotational position and disengage in the second rotational position.

11. The air cleaner system of claim 7, wherein the first plurality of flanges and the locking element are integrally molded as part of the first portion and the second plurality of flanges and the receiving element are integrally molded as part of the second portion.

12. The air cleaner system of claim 1, wherein said first plurality of flanges is configured to be inserted behind the second plurality of flanges.

13. An air cleaner for the combustion air of an internal combustion engine, comprising:

an air cleaner tube extending along a central axis;

an air cleaner box having an opening to partially receive the air cleaner tube;

a removable air filter disposed inside the air cleaner box;

a first portion of a twist fit connector disposed around the air cleaner tube, having a first plurality of spaced-apart flanges encircling a substantially circular first edge thereof and a locking element disposed on a second edge thereof;

a second portion of the twist fit connector disposed on the air cleaner box, having a second plurality of spaced-apart flanges encircling a substantially circular first edge thereof and a receiving element disposed on a second edge thereof, wherein the twist fit connector moves between a first position, in which the first plurality of flanges is configured to be inserted in the spaces between the second plurality of flanges and the locking element engages and abuts the receiving element to hold the air cleaner box and tube together, and a second position, in which the first plurality of flanges is configured to be disengaged from the second portion via the spaces between the second plurality of flanges and the locking element disengages from the receiving element to detach the air cleaner tube from the air cleaner box; and a first seal disposed between the air filter and the air cleaner tube, whereby dirty air passes through the air filter before exiting the air cleaner box when the twist fit connector is in the first position.

14. The air cleaner of claim 13, wherein the first plurality of flanges comprise outwardly radiating flanges that are intermittently spaced apart from each other and the second plurality of flanges comprise inwardly radiating flanges that are intermittently spaced apart from each other, such that when the locking and receiving elements are lined up along the central axis, each flange of the first plurality of flanges fits in the corresponding space between a set of flanges in the second plurality of flanges.

15. The air cleaner of claim 13, wherein the first plurality of flanges comprise inwardly radiating flanges that are intermittently spaced apart from each other and the second plurality of flanges comprise outwardly radiating flanges that are intermittently spaced apart from each other, such that when the locking and receiving elements are lined up along the central axis, each flange of the first plurality of flanges fits in the corresponding space between a set of flanges in the second plurality of flanges.

16. The air cleaner of claim 13, further comprising a second seal disposed between the first and second portions of the twist fit connector.

17. The air cleaner of claim 13, wherein the locking element comprises a stepped cantilever snap element of a semi-resilient material and the receiving element comprises a ramped element and a stop element.

18. The air cleaner of claim 17, wherein the first position is achieved by clockwise rotation of the first portion until the stepped cantilever snap element abuts the stop element preventing further rotation is either direction and the second position is achieved by sufficiently lifting a portion of the stepped cantilever snap element until the cantilever snap element clears the ramped element and then counter-clockwise rotation of the first portion till the first plurality of flanges line up with the spaces in between the second plurality of flanges such that the air cleaner tube can be detached from the air cleaner box.

19. A method of assembling an air cleaner, comprising:

(a) inserting one end of an air cleaner tube into an opening of an air cleaner housing;

(b) aligning a locking element disposed on the air cleaner tube with a receiving element disposed on the air cleaner housing along a central axis extending along the air cleaner tube and housing;

(c) inserting a first plurality of flanges encircling the air cleaner tube in between the corresponding spaces between a second plurality of flanges disposed on the air cleaner housing;

(d) contacting the locking and receiving elements; and (e) rotating the locking element relative to the receiving element around the central axis extending along the air cleaner tube and housing till further rotation in either direction is prevented by the locking element abutting a section of the receiving element.

20. The method of claim 19, further comprising:

lifting a portion of the locking element away from the receiving element;

rotating the locking element relative to the receiving element along the central axis in the opposite direction of the rotating step (e) till the first plurality of flanges align with the spaces in between the second plurality of flanges;

detaching the air cleaner tube away from the air cleaner housing; and repeating steps (a) to (e) to repeatedly reassemble the air cleaner as desired.

21. The method of claim 19, wherein the rotating step (e) includes moving the first plurality of flanges to at least partially align behind the second plurality of flanges such that the air cleaner tube is prevented from being pulled out by a force substantially along the direction of the central axis.

* * * * *